(12) United States Patent
Nishimura et al.

(10) Patent No.: US 7,140,872 B2
(45) Date of Patent: Nov. 28, 2006

(54) MOLDING MACHINE

(75) Inventors: Koichi Nishimura, Susono (JP);
Masatoshi Senga, Yamanashi (JP)

(73) Assignee: Panuc Ltd, Yamanashi (JP)

( * ) Notice: Subject to any disclaimer, the term of this patent is extended or adjusted under 35 U.S.C. 154(b) by 0 days.

(21) Appl. No.: 10/804,017

(22) Filed: Mar. 19, 2004

(65) Prior Publication Data
US 2004/0185143 A1   Sep. 23, 2004

(30) Foreign Application Priority Data
Mar. 19, 2003  (JP) ............................. 2003-074884

(51) Int. Cl.
*B29C 45/04* (2006.01)
(52) U.S. Cl. ...................... 425/589; 425/590; 425/193; 425/190; 425/225
(58) Field of Classification Search ................. 425/589, 425/590, 193, 190, 225
See application file for complete search history.

(56) References Cited

U.S. PATENT DOCUMENTS

| | | | |
|---|---|---|---|
| 3,674,400 A | | 7/1972 | Sauerbruch et al. |
| 4,099,905 A | * | 7/1978 | Nash et al. ................. 425/589 |
| 5,922,370 A | * | 7/1999 | Ziv-Av ........................ 425/589 |
| 6,155,811 A | * | 12/2000 | Looije et al. ............... 425/190 |
| 6,503,075 B1 | | 1/2003 | Schad et al. |
| 6,626,659 B1 | * | 9/2003 | Ash et al. ................... 425/190 |

FOREIGN PATENT DOCUMENTS

| | | |
|---|---|---|
| EP | 0 554 0680 A1 | 8/1993 |
| JP | 6-39960 | 10/1994 |
| JP | 7-323453 | 12/1995 |
| JP | 9-225979 | 9/1997 |
| JP | 2696706 | 9/1997 |
| JP | 9-262884 | 10/1997 |
| JP | 2000-280275 | 10/2000 |
| WO | 01/28749 A1 | 4/2001 |

OTHER PUBLICATIONS

Rosato, D. V., "Injection Molding Handbook", 1995, Chapman & Hall, New York.

* cited by examiner

*Primary Examiner*—Joseph S. Del Sole
*Assistant Examiner*—Maria Veronica Ewald
(74) *Attorney, Agent, or Firm*—Staas & Halsey LLP

(57) ABSTRACT

A molding machine including a base frame assembly and a clamping mechanism and an injection mechanism provided on the base frame assembly. The clamping mechanism includes a stationary platen carrying a stationary mold; a movable platen arranged movably relative to the stationary platen and carrying a movable mold; a rear platen disposed at a location opposite to the stationary platen about the movable platen; a tie bar tying the stationary platen and the rear platen with each other; a drive section for applying a drive force to the movable platen so as to move the movable platen relative to the stationary platen; and a platen support movably supporting the movable platen on the base frame assembly. The base frame assembly includes a first base frame supporting a first mass including the stationary platen, and a second base frame supporting a second mass including the movable platen, among the components of the molding machine.

7 Claims, 4 Drawing Sheets

MOLDING MACHINE

BACKGROUND OF THE INVENTION

1. Field of the Invention

The present invention relates generally to a molding machine and, more particularly, to an improvement of a base frame for supporting a stationary platen and a movable platen each carrying a mold in the molding machine.

2. Description of the Related Art

In a clamping mechanism of a molding machine (e.g., an injection molding machine), it is generally required that, when the molds are to be opened or closed by the travel of a movable platen relative to a stationary platen (i.e., a mold clamping or opening operation), a movable mold attached to the movable platen is accurately moved, in translation or parallel displacement, relative to a stationary mold attached to the stationary platen. In other words, it is necessary to move the movable platen while maintaining a predetermined parallelism (or a parallel positional correlation) between the stationary mold and the movable mold. If the parallelism is disturbed, the smoothness of the opening/closing motion of the molds may be deteriorated, molding defects may be caused due to an inaccurate clamping, or the molds may be damaged due to an irregular clamping pressure.

Conventionally, in order to accurately move, in translation or parallel displacement, the movable mold relative to the stationary mold, it is known that a platen support formed from a motion facilitating element, such as a slide plate, a roller or a linear guide, is attached to the bottom of the movable platen and is placed in a movable manner on the supporting surface of a base frame of the molding machine, so that the weight of the movable platen is borne on the base frame while the movable platen is moved along the support surface of the base frame. For example, Japanese Unexamined Patent Publication (Kokai) No. 9-262884 (JP9-262884A) discloses an injection molding machine in which a pair of linear guide units (i.e., platen supports), provided on a base frame, guide and support a movable platen on the base frame. Also, Japanese Unexamined Patent Publication (Kokai) No. 9-225979 (JP9-225979A) discloses an injection molding machine, in which first and second linear guide mechanisms (i.e., platen supports) possessing jointly a pair of guide rails provided on a base frame, guide and support a stationary platen and a movable platen, respectively, in a movable manner on the base frame.

Also, Japanese Patent Publication No. 2696706 (JP2696706B2) discloses a clamping mechanism of an injection molding machine, in which a slide mechanism (i.e., a platen support), composed of a guide channel provided on a base frame and a rib provided on the bottom face of the movable platen, guide and support the movable platen on the base frame. Also, Japanese Examined Utility Model Publication (Kokoku) No. 6-39960 (JP6-39960Y2) discloses a clamping mechanism of a molding machine, in which a tie bar tying a stationary platen to a rear platen guides and supports a movable platen, while a support unit (i.e., a platen support) slidable or rollable on the supporting surface of a base frame is attached to the bottom of the movable platen in such a manner as to be shiftable relative to the movable platen by a predetermined distance in a height direction, so that the support unit supports the weight of the movable platen in an auxiliary manner.

Also, Japanese Unexamined Patent Publication (Kokai) No. 2000-280275 (JP2000-280275A) discloses an injection molding machine including an intermediate mold arranged between a stationary mold and a movable mold, in which a slide guide is provided, as means similar to a platen support, on a tie bar for preventing the intermediate mold cantilevered on a stationary platen or a movable platen from being lowered due to its own weight.

The base frame of the molding machine is liable to be bent due to its own weight as well as the weight of components mounted on the base frame, such as a movable mold, a stationary mold, a rear platen, and so on. The bending or flexure generated in the base frame may affect the parallelism between the stationary mold and the movable mold, i.e., the parallelism between the stationary platen and the movable platen, even when the above-described platen support is used. In other words, the parallelism between the stationary platen and the movable platen depends on the rigidity or stiffness of the base frame. However, if the rigidity of the base frame is increased to such a degree that the parallelism between the stationary platen and the movable platen can be maintained in a high accuracy, the production cost of the molding machine may, as a result, rise.

As a solution for ensuring the rigidity of a base frame in the molding machine, Japanese Unexamined Patent Publication (Kokai) No. 7-323453 (JP7-323453A) discloses a clamping mechanism of a molding machine, in which a set plate having a desired rigidity is supported on the top plate of a base frame in a three-point or four-point suspension system, and a movable platen and a rear platen are secured on the set plate. The rigidity of the set plate is selected as such a degree that any influence of the weight of the clamping mechanism over the parallelism between the stationary platen and the rear platen can be eliminated. In this arrangement, the base frame may still be bent due to the weight of the set plate and components supported thereon, so that it is difficult to stably ensure the accuracy of the translation or parallel displacement of the movable platen.

SUMMARY OF THE INVENTION

It is an object of the present invention to provide a molding machine including a base frame structure for supporting components, such as a stationary platen, a movable platen, a rear platen, and so on, which can relieve the bending or flexure of the base frame due to its own weight and/or the weight of the components, so as to improve the accuracy of the translation or parallel displacement of the movable platen relative to the stationary platen.

To accomplish the above object, the present invention provides a molding machine, comprising a stationary platen carrying a stationary mold; a movable platen arranged movably relative to the stationary platen and carrying a movable mold; a first base frame supporting a first mass including the stationary platen; and a second base frame supporting a second mass different from the first mass, the second mass including the movable platen.

In the above molding machine, the first base frame and the second base frame may be independently shiftable relative to each other.

Also, it is preferred that at least one of the first base frame and the second base frame is provided with a level adjusting mechanism for adjusting a relative height and a parallelism between the stationary platen and the movable platen.

Also, the molding machine may further comprise a rear platen disposed at a location opposite to the stationary platen about the movable platen, and a tie bar tying the stationary platen and the rear platen with each other and defining a longitudinal axis extending in a direction of movement of the movable platen; wherein the first mass includes the rear platen and the tie bar.

Also, the molding machine may further comprise a platen support movably supporting the movable platen on the second base frame; wherein the second mass includes the platen support.

Also, the molding machine may further comprise a drive section for applying a drive force to the movable platen so as to move the movable platen relative to the stationary platen; wherein the first mass includes the drive section.

Also, the first base frame and the second base frame may be locally connected to each other.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

Figure 1:
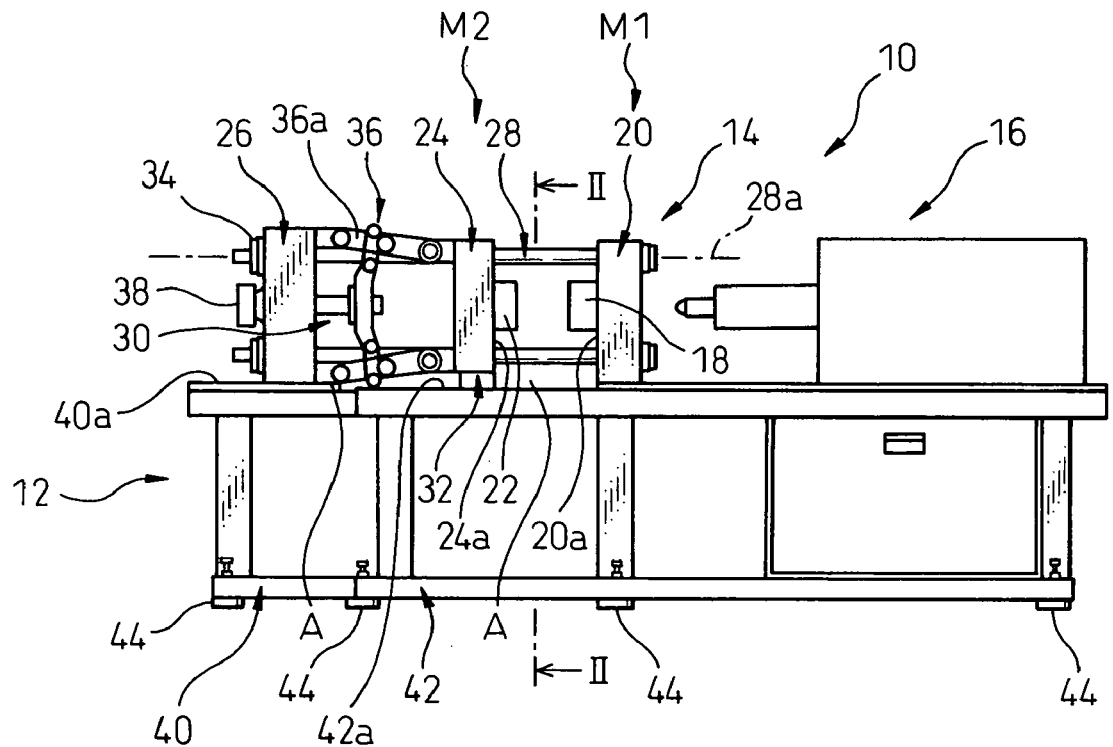
FIG. 1 is a partially cut-out schematic front view showing a molding machine according to a first embodiment of the present invention.

The embodiments of the present invention are described below, in detail, with reference to the accompanying drawings. In the drawings, the same or similar components are denoted by common reference numerals.

Figure 2:
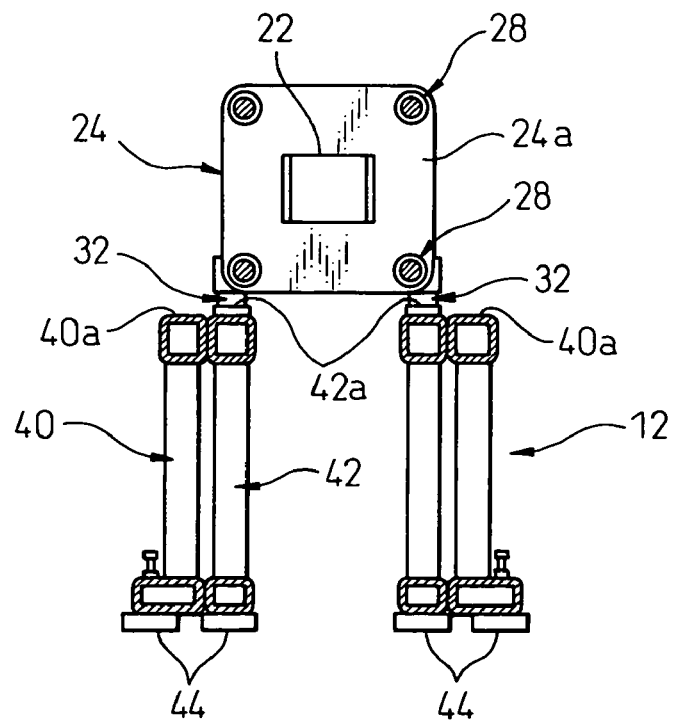
FIG. 2 is a schematic sectional view showing the molding machine of FIG. 1, taken along a line II—II.

Referring to the drawings, FIGS. 1 and 2 show a molding machine (an injection molding machine) 10, according to the first embodiment of the present invention. The molding machine 10 includes a base frame assembly 12, a clamping mechanism 14 provided on the base frame assembly 12, and an injection mechanism 16 provided on the base frame assembly 12 at a location near the clamping mechanism 14. The clamping mechanism 14 includes a stationary platen 20 carrying a stationary mold 18; a movable platen 24 arranged movably relative to the stationary platen 20 and carrying a movable mold 22; a rear platen 26 disposed at a location opposite to the stationary platen 20 about the movable platen 24; a tie bar 28 tying the stationary platen 20 and the rear platen 26 with each other and defining a longitudinal axis 28a extending in a direction of movement of the movable platen 24; a drive section 30 for applying a drive force to the movable platen 24 so as to move the movable platen 24 relative to the stationary platen 20; and a platen support 32 movably supporting the movable platen 24 on the base frame assembly 12 along the tie-bar axis 28a. The injection mechanism 16 may include known components, such as a screw, a cylinder, a nozzle, and so on.

In the illustrated embodiment, four tie bars 28 are arranged between the stationary platen 20 and the rear platen 26. Each tie bar 28 is fixedly attached at one end to the stationary platen 20 by a fastening element such as a nut, and is attached at the other end to the rear platen 26 through a die-height adjusting nut 34 in a manner shiftable along the tie bars 28. When the die-height adjusting nuts 34 of the tie bars 28 are operated synchronously, the rear platen 26 is shifted on the base frame assembly 12 along the tie-bar axis 28a, to adjust the distance between the stationary platen 20 and the rear platen 26, whereby it is possible to adjust a clamping force.

The stationary mold 18 and the movable mold 22 are attached respectively to the mutually opposing, generally rectangular mold-attaching surfaces 20a, 24a of the stationary platen 20 and the movable platen 24. The movable platen 24 receives the tie bars 28, respectively in through-holes formed at the four corners thereof, in a manner relatively movable along the axis 28a. The drive section 30 includes a double toggle unit 36 and a drive source 38, such as a servo motor, for driving the double toggle unit 36. A pair of arms 36a of the double toggle unit 36 is arranged between the movable platen 24 and the rear platen 26, and the drive source 38 is carried on the rear platen 26. When the drive source 38 is actuated to drive the double toggle unit 36, so as to move, in translation, the movable platen 24 along the tie bars 28, the stationary mold 18 carried on the stationary platen 20 and the movable mold 22 carried on the movable platen 24 are operated to open or close (a mold opening or clamping operation).

The platen support 32 is formed from a motion facilitating element, such as a slide plate, a roller, a linear guide, and so on. In the illustrated embodiment, two platen supports 32 are attached to the bottom of the movable platen 24. The platen supports 32 are placed in a movable manner on the supporting surface of the base frame assembly 12, so as to move along the supporting surface, while bearing at least partially the weight of the movable platen 24, during the above-described translation of the movable platen 24. Each platen support 32 may have a construction as disclosed in, for example, U.S. Pat. No. 3,674,400 issued Jul. 4, 1972 to Sauerbruch et al., the teachings of which are hereby incorporated by reference.

The base frame assembly 12 includes a first base frame 40 for supporting or bearing a mass part (referred to as a first mass, in the present application) M1 including the stationary platen 20, among the components of the molding machine 10; and a second base frame 42 for supporting or bearing a mass part (referred to as a second mass, in the present application) M2 including the movable platen 24, among the components of the molding machine 10. In this connection, the first mass M1 and the second mass M2 are mass parts different from each other. Further, the first base frame 40 and the second base frame 42 may support mainly the first mass M1 and the second mass M2, respectively, so that it is possible for the first base frame 40 to support the second mass M2 in an auxiliary manner, and also for the second base frame 42 to support the first mass M1 in an auxiliary manner. In summary, provided that the first base frame 40 and the second base frame 42 respectively share substantially the support of the stationary platen 20 and the movable platen 24 with each other, the first and second base frames 40, 42 may suitably share the support of the mass (the weight) of the components of the molding machine 10 with each other.

In the illustrated embodiment, the stationary platen 20, the rear platen 26, the tie bars 28 and the drive section 30 in the clamping mechanism 14, as well as the injection mechanism 16, are included in the first mass M1 and supported on the first base frame 40. The stationary platen 20 in the clamping mechanism 14, and the injection mechanism 16, are fixedly mounted on the generally flat supporting surface 40a at the top of the first base frame 40, while the rear platen 26 in the clamping mechanism 14 is movably mounted on the supporting surface 40a of the first base frame 40. On the other hand, the movable platen 24 and the platen supports 32 in the clamping mechanism 14 are included in the second mass M2 and supported on the second base frame 42. The platen supports 32 are movably mounted on the generally flat supporting surface 42a at the top of the second base frame 42. Thus, in the illustrated embodiment, the first mass M1 is heavier than the second mass M2.

In the illustrated embodiment, the first base frame 40 and the second base frame 42 are separate from each other, and are disposed with a clearance therebetween (FIG. 2). The first and second base frames 40, 42 are frame members constructed by assembling plural horizontal beams and plural vertical columns. In FIG. 1, the area indicated between two cutting lines "A" shows a part of the second base frame by omitting the first base frame 40.

Figure 3:
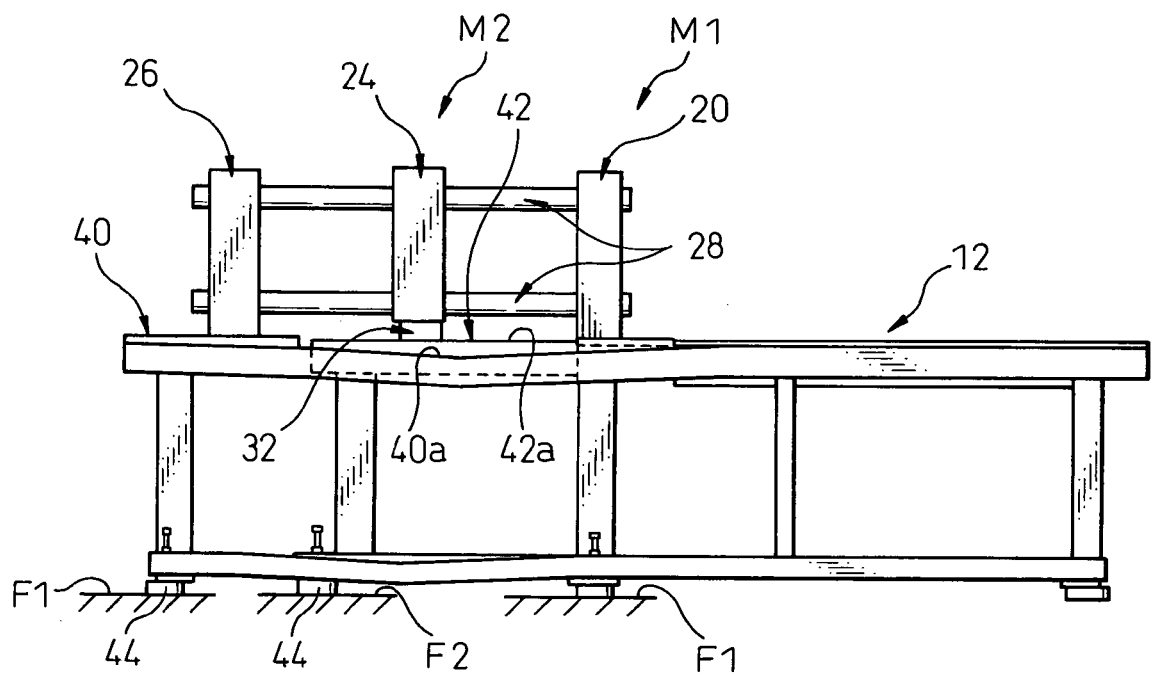
FIG. 3 is a typical illustration for explaining a flexure caused in a base frame assembly of the molding machine of FIG. 1.

The first base frame 40 and the second base frame 42, which are separate from each other, are independently shiftable relative to each other. Therefore, even when the first base frame 40 and/or a floor face F1 on which the first base frame is mounted, is bent or deformed due to the weight of the first base frame 40 and/or the first mass M1, and thereby the supporting surface 40a of the first base frame 40 is curved, as shown in FIG. 3, the second base frame 42 is not influenced by this bending. Also, if the second base frame 42 and a floor face F2 on which the second base frame is mounted, have such a rigidity as to substantially eliminate any bending or flexure due to the weight of the second base frame 42 and the second mass M2, it is possible to maintain the second base frame 42 in a condition where the supporting surface 42a thereof is substantially flat, regardless of the bending or deformation generated in the first base frame 40 and/or the floor face F1. As a result, the platen supports 32 mounted on the supporting surface 42a of the second base frame 42 are able to move smoothly in a horizontal direction on the supporting surface 42a while bearing the movable platen 24, so that the movable platen 24 is able to stably move in translation while maintaining the parallelism in higher accuracy relative to the stationary platen 20, without unintentionally bending the tie bars 28.

Thus, according to the molding machine 10, even if the supporting surface 40a of the first base frame 40 is curved due to the weight of the first mass M1 including the stationary platen 20, the second base frame 42 supporting the second mass M2 including the movable platen 24 is not influenced thereof and thus is able to support the movable platen 24 on the generally flat supporting surface 42a. In this connection, the second base frame 42 does not entirely support all components of the molding machine 10, so that it is possible to reduce the bending or flexure which may otherwise appear in the second base frame 42, and thus to minimize or suppress the tilt of the movable platen 24 on the supporting surface 42a. As a result, in a mold-clamping or mold-opening process, it is possible to stably move, in translation or parallel displacement, the movable platen 24 relative to the stationary platen 20, while maintaining in higher accuracy the parallelism between the movable platen 24 and the stationary platen 20, and thereby to improve the accuracy in the opening or closing motion of the molds, so as to prevent the molding defects in the molded article and the damage in the molds. It should be noted that it is possible to improve the accuracy in the opening or closing motion of the molds merely by increasing the rigidity or stiffness of the second base frame 42 supporting the second mass M2 including the movable platen 24, so that the highly accurate mold-clamping or mold-opening is capable of being realized in a lower cost in comparison with the case where the rigidity of the base assembly 12 is increased in its entirety.

In the molding machine 10, at least one of the first base frame 40 and the second base frame 42 may be provided at a desired position with a variable mount 44 as a level adjusting mechanism. In the illustrated embodiment, plural variable mounts 44 are respectively provided for the first and second base frames 40, 42. In this arrangement, when the variable mounts 44 are suitably operated, it is possible to adjust the heights and horizontality of the supporting surfaces 40a, 42a of the first and second base frames 40, 42. As a result, it is possible to adjust a relative height and a parallelism between the stationary platen 20 and the movable platen 24, as well as between the stationary mold 18 and the movable mold 22.

Figure 4:
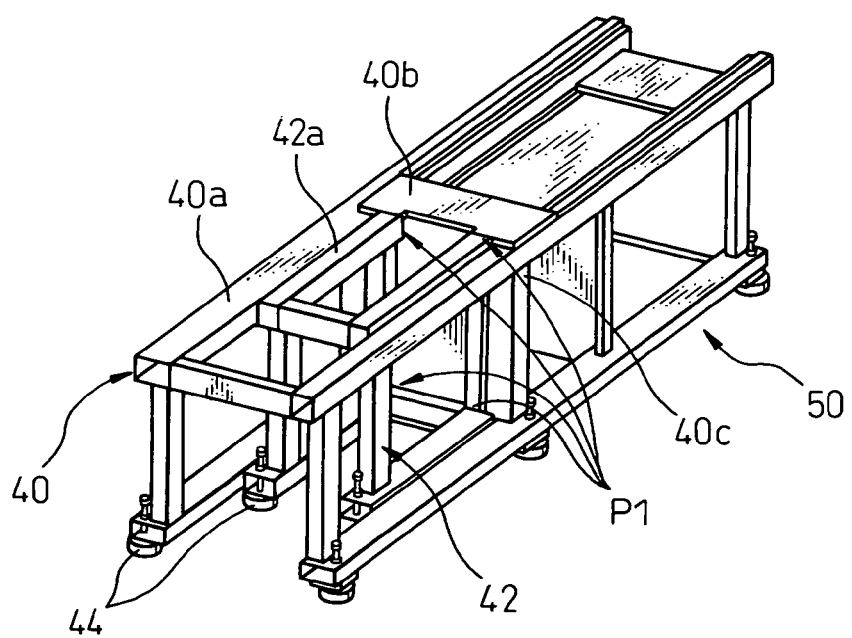
FIG. 4 is a schematic perspective view showing a base frame assembly of a molding machine according to a second embodiment of the present invention.

FIG. 4 shows a base frame assembly 50 of a molding machine according to the second embodiment of the present invention. The base frame assembly 50 in the second embodiment has a configuration substantially identical to the base frame assembly 12 in the first embodiment, except that the first base frame and the second base frame are connected to each other at a local point. Therefore, corresponding components are denoted by common reference numerals and the detailed descriptions thereof are not repeated.

The base frame assembly 50 includes a first base frame 40 for supporting a first mass M1 including a stationary platen 20 (FIG. 1), and a second base frame 42 for supporting a second mass M2 including a movable platen 24 (FIG. 1). The second base frame 42 is locally joined and fixed to the first base frame 40 by fixing means such as welding, bolting, and so on, at an end point P1 (four points, in the figure) located near a supporting surface part 40b bearing the stationary platen 20. The supporting surface part 40b of the first base frame 40 is positioned above a vertical column 40c as illustrated, and thereby is not significantly influenced by the bending or flexure of the first base frame 40. Therefore, when the second base frame 42 is joined at the end points P1 to certain points of the first base frame 40 in proximity with the supporting surface part 40b, it is also possible to diminish the influence of the bending or flexure of the first base frame 40 on the second base frame 42.

The second base frame 42 is provided, at the other end thereof opposite to the joined end points P1, with variable mounts 44 as a level adjusting mechanism. The first base frame 40 and the second base frame 42 are joined to each other in the condition where a level adjustment is established so that the former supporting surface 40a (including the supporting surface part 40b) and the latter supporting surface 42a constitute a substantially flush surface around the joined end points P1. Thereafter, by suitably operating the variable mounts 44, it is possible to adjust the horizontality of the supporting surface 42a of the second base frame 42.

It will be appreciated that the base frame assembly 50 having the above configuration possesses characteristic effects substantially identical to those of the base frame assembly 12 of the molding machine 10. Especially, in the base frame assembly 50, the first and second base frames 40, 42 are joined to each other at certain points capable of diminishing the mutual influence of the bendings or deformations of the base frames, so that there is an advantage that the heights and horizontality of the supporting surfaces 40a, 42a of the first and second base frames 40, 42 are capable of being relatively easily adjusted.

Figure 5:
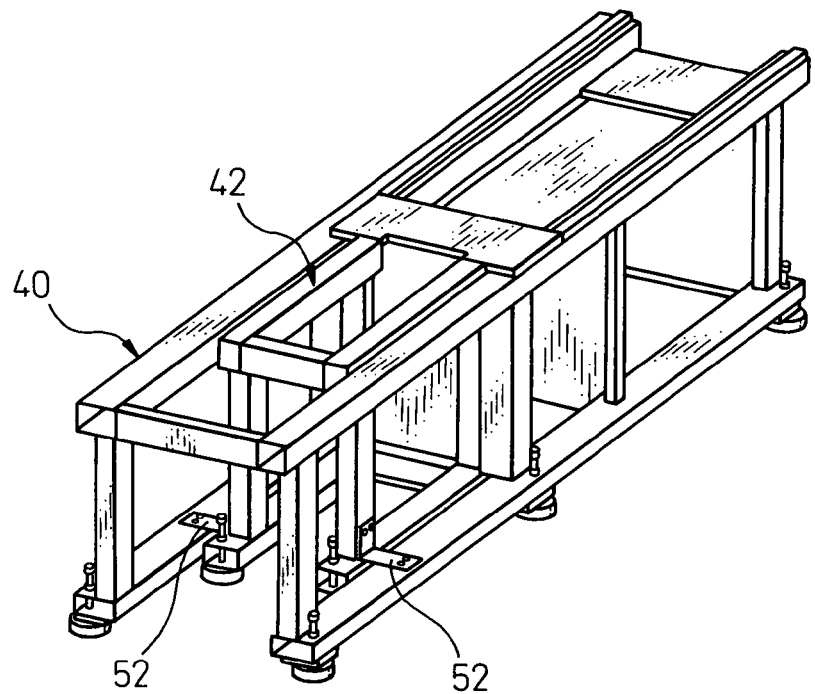
FIG. 5 is a schematic perspective view showing a modification of the base frame assembly of FIG. 4.

In the base frame assembly 50 as described above, the first base frame 40 and the second base frame 42 are locally connected to each other, whereby the first and second base frames 40, 42 may collide with each other, at, e.g., the end portions away from the mutually joined points of the base frames, which may result in damage to the base frames 40, 42. Therefore, in a transportation and storage of the base frame assembly 50, it is advantageous, as shown in FIG. 5, that a detachable fastening member 52 is used to temporarily fasten the first and second base frames 40, 42 to each other at a certain point other than the mutually joined points thereof. The fastening member 52 acts not only to avoid an inadvertent collision between the first and second base frames 40, 42 during a transportation and storage, but also to prevent the positional deviation of the base frames in a lateral direction after the heights and horizontality of the supporting surfaces 40a, 42a of the first and second base frames 40, 42 are adjusted.

Figure 6:
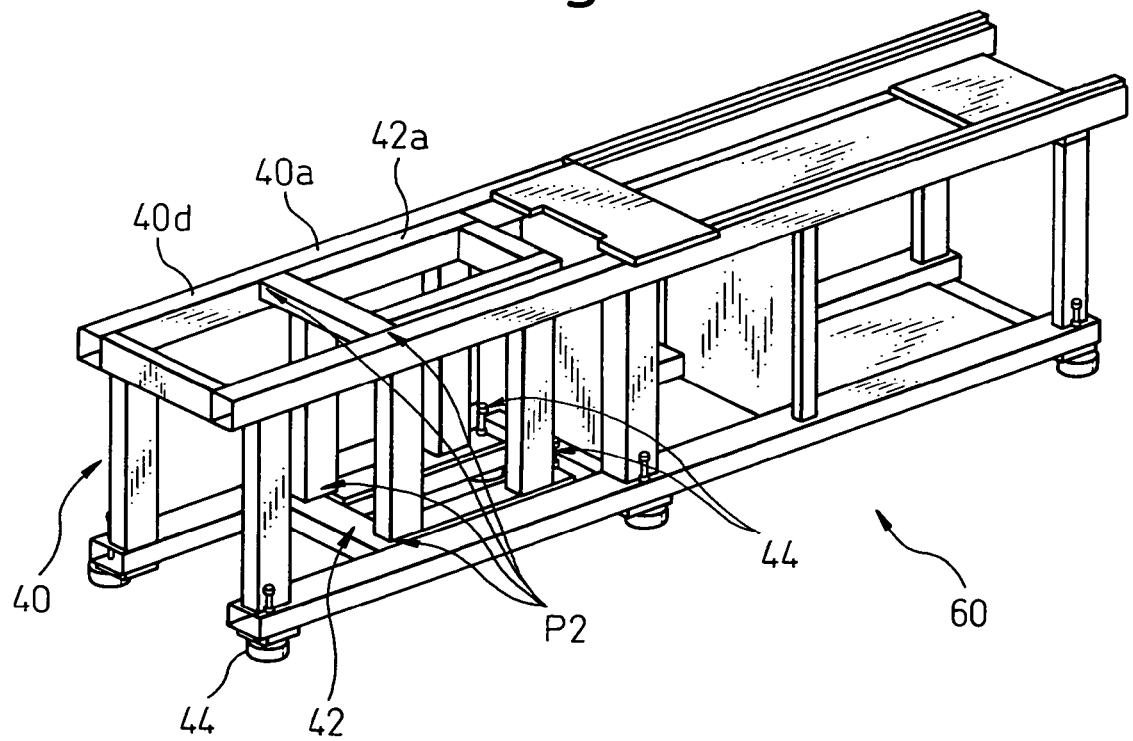
FIG. 6 is a schematic perspective view showing a base frame assembly of a molding machine according to a third embodiment of the present invention.

FIG. 6 shows a base frame assembly 60 of a molding machine according to the third embodiment of the present invention. The base frame assembly 60 in the third embodiment has a configuration substantially identical to the base frame assembly 50 in the second embodiment, except that the mutually joined points of first and second base frames are different. Therefore, corresponding components are denoted by common reference numerals and the detailed descriptions thereof are not repeated.

In the base frame assembly 60, the second base frame 42 is locally joined and fixed to the first base frame 40 by fixing means such as a welding, a bolting, and so on, at an end point P2 (four points, in the figure) located near a supporting surface part 40d bearing a rear platen 26 (FIG. 1). The supporting surface part 40d of the first base frame 40 may be influenced by the bending or flexure of the first base frame 40, more easily than the supporting surface part 40b described in relation to the second embodiment. Therefore, when the second base frame 42 is joined to the first base frame 40 at the location near the supporting surface part 40d, it is possible for the second base frame 42 to support a first mass (FIG. 1) in an auxiliary manner, so as to reduce the bending or flexure of the first base frame 40. Further, the second base frame 42 is joined at the end points P2 to the first base frame 40, so that the influence of the bending or flexure of the first base frame 40 on the second base frame 42 is diminished.

The second base frame 42 is provided, at the other end thereof opposite to the joined end points P2, with variable mounts 44 as a level adjusting mechanism. The first base frame 40 and the second base frame 42 are joined to each other in the condition where a level adjustment is established so that the former supporting surface 40a (including the supporting surface part 40d) and the latter supporting surface 42a constitute a substantially flush surface around the joined end points P2. Thereafter, suitably operating the variable mounts 44, it is possible to adjust the horizontality of the supporting surface 42a of the second base frame 42.

It will be appreciated that the base frame assembly 60 having the above configuration possesses characteristic effects substantially identical to those of the base frame assembly 50 as described. Also, in the base frame assembly 60, the first and second base frames 40, 42 may be temporarily fastened to each other at a certain point other than the mutually joined points thereof by using the detachable fastening member 52 as described above.

Figure 7:
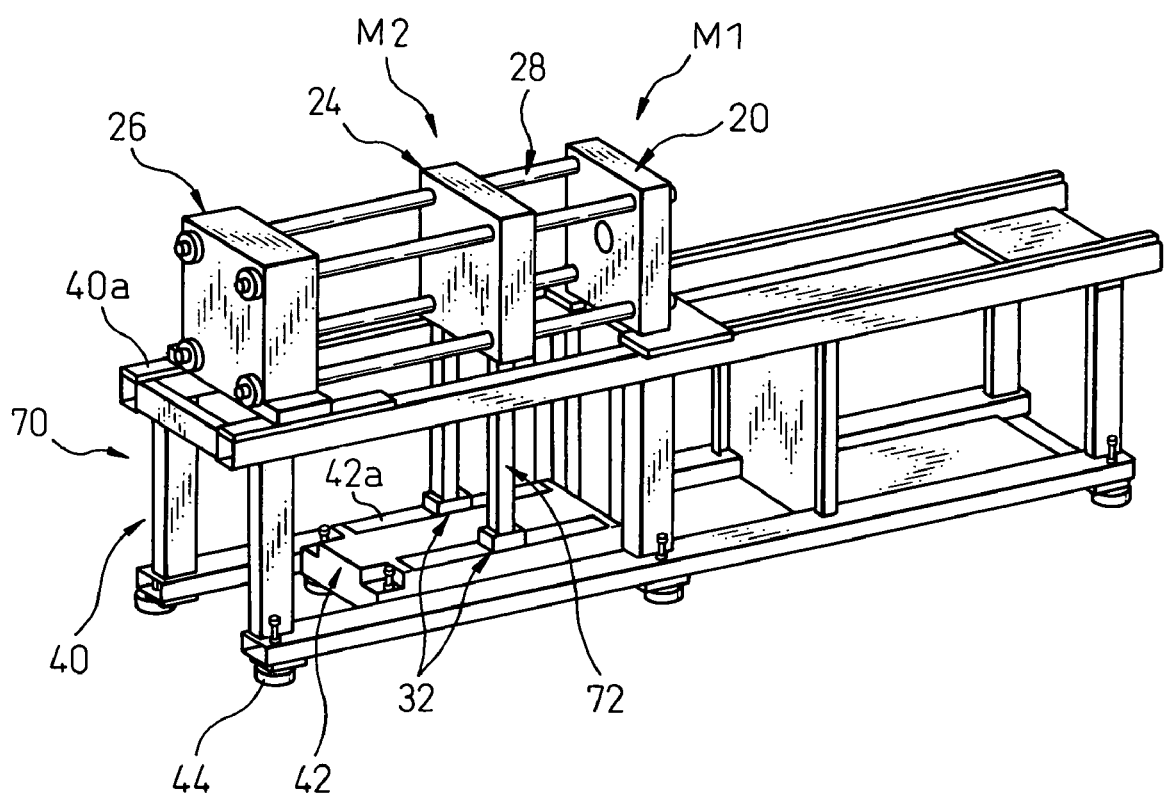
FIG. 7 is a schematic perspective view showing a main portion of a molding machine according to a fourth embodiment of the present invention.

FIG. 7 shows a base frame assembly 70 of a molding machine according to the fourth embodiment of the present invention. The base frame assembly 70 in the fourth embodiment has a configuration substantially identical to the base frame assembly 12 in the first embodiment, except for the provision of a different second base frame. Therefore, corresponding components are denoted by common reference numerals and the detailed descriptions thereof are not repeated.

The base frame assembly 70 includes a first base frame 40 for supporting a first mass M1 including a stationary platen 20, and a second base frame 42 for supporting a second mass M2 including a movable platen 24. The second base frame 42 has a low-profile block structure formed from a solid casting, which is different from the second base frame 42 of the base frame assembly 12, 50 or 60, having a frame structure as described. Therefore, the supporting surface 42a of the second base frame 42 is located at a position lower than the supporting surface 40a of the first base frame 40. Thus, a pair of leg members 72 is provided between the movable platen 24 and the platen supports 32 to keep the movable platen 24 at a predetermined height.

It will be appreciated that the base frame assembly 70 having the above configuration possesses characteristic effects substantially identical to those of the base frame assembly 12 of the molding machine 10. Especially, in the base frame assembly 70, the second base frame 42 is formed from a casting, so that there is an advantage that the rigidity or stiffness of the second base frame is easily increased.

Also, in the base frame assembly 70, it is possible to locally join the second base frame 42 to the first base frame 40, in the similar way to the base frame assembly 50 or 60 as described.

Further, although the respective embodiments as described above are directed to the configuration wherein the double toggle unit 36 is used in the drive section 30, the characteristic arrangements of the present invention may also be applied to a clamping mechanism including a direct-pressurizing drive section wherein the movable platen 24 is directly driven by the drive source 38 such as a hydraulic cylinder or a servo motor, without using the toggle unit. It will be appreciated that, in this configuration, characteristic effects equivalent to those of the respective embodiments can also be obtained.

While the invention has been described with reference to specific preferred embodiments, it will be understood, by those skilled in the art, that various changes and modifications may be made thereto without departing from the spirit and scope of the following claims.

The invention claimed is:

1. A molding machine, comprising:
   a stationary platen carrying a stationary mold;
   a movable platen arranged movably relative to said stationary platen and carrying a movable mold;
   a first base frame supporting a first mass including said stationary platen; and
   a second base frame supporting a second mass different from said first mass, said second mass including said movable platen,
   further comprising a rear platen disposed, at a location opposite to said stationary platen, about said movable platen, and a tie bar tying said stationary platen and said rear platen with each other and defining a longitudinal axis extending in a direction of movement of said movable platen;
   wherein said first mass includes said rear platen and said tie bar.

2. A molding machine, as set forth in claim 1, wherein said first base frame and said second base frame are independently shiftable relative to each other.

3. A molding machine, as set forth in claim 1, wherein at least one of said first base frame and said second base frame is provided with a level adjusting mechanism for adjusting a relative height and a parallelism between said stationary platen and said movable platen.

4. A molding machine, as set forth in claim 1, further comprising a platen support movably supporting said movable platen on said second base frame; wherein said second mass includes said platen support.

5. A molding machine, as set forth in claim 1, further comprising a drive section for applying a drive force to said movable platen so as to move said movable platen relative to said stationary platen; wherein said first mass includes said drive section.

6. A molding machine, as set forth in claim 1, wherein said first base frame and said second base frame are locally connected to each other.

7. A molding machine, comprising:

a movable platen carrying a movable mold arranged movably relative to a stationary platen carrying a stationary mold; and;

a first base frame supporting said stationary platen and a second base frame supporting said movable platen;

further comprising a rear platen disposed, at a location opposite to said stationary platen, about said movable platen, and a tie bar tying said stationary platen and said rear platen with each other and defining a longitudinal axis extending in a direction of movement of said movable platen;

wherein said first base frame supports said rear platen and said tie bar.

* * * * *

UNITED STATES PATENT AND TRADEMARK OFFICE
CERTIFICATE OF CORRECTION

PATENT NO. : 7,140,872 B2
APPLICATION NO. : 10/804017
DATED : November 28, 2006
INVENTOR(S) : Koichi Nishimura et al.

It is certified that error appears in the above-identified patent and that said Letters Patent is hereby corrected as shown below:

Title Page, Column 1 Item [73] (Assignee), Line 1, change "Panuc" to --Fanuc--.

Column 10, Line 6, change "platen:" to --platen,--.

Signed and Sealed this

Twelfth Day of June, 2007

JON W. DUDAS
*Director of the United States Patent and Trademark Office*